Nov. 8, 1966   KARL-HEINZ ECKHARDT ET AL   3,283,926
TRANSPORTING UNIT, ESPECIALLY FOR RAILWAY TRACK SECTIONS
Filed Oct. 23, 1964   4 Sheets-Sheet 4
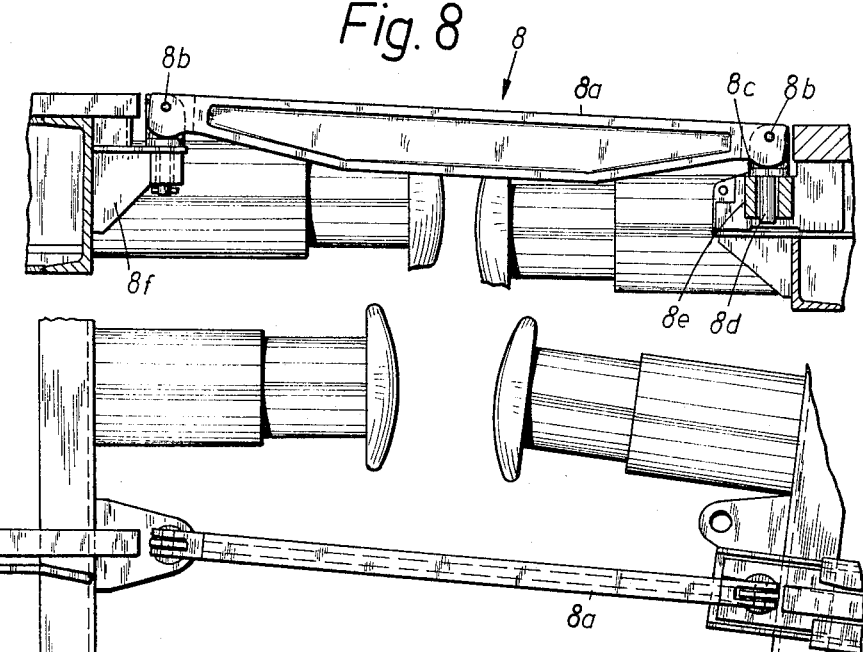
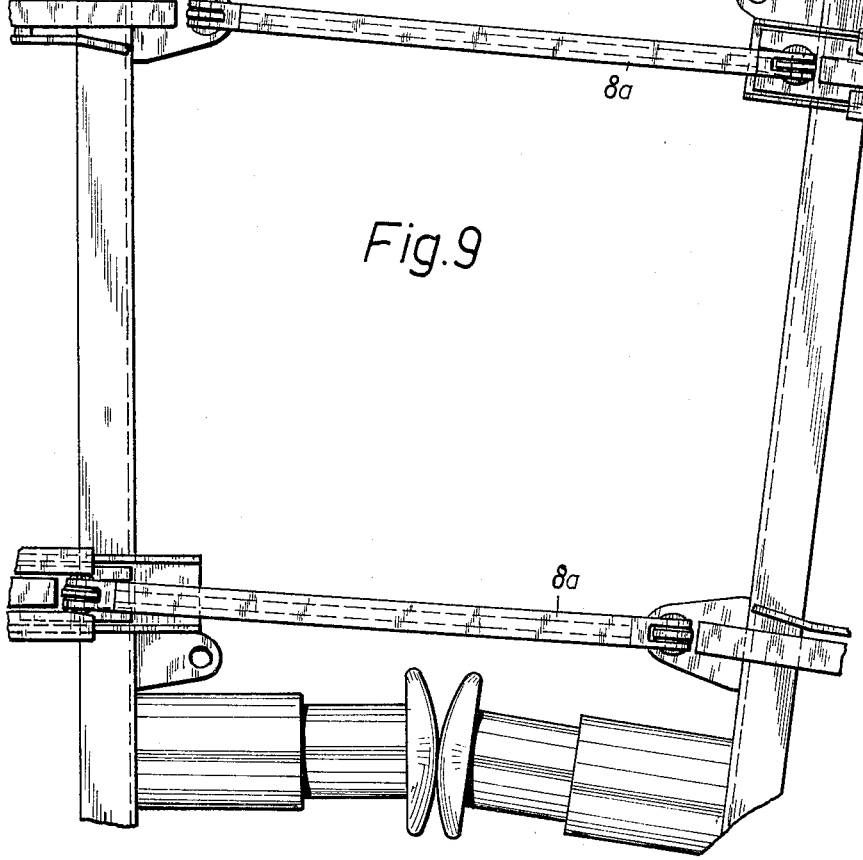

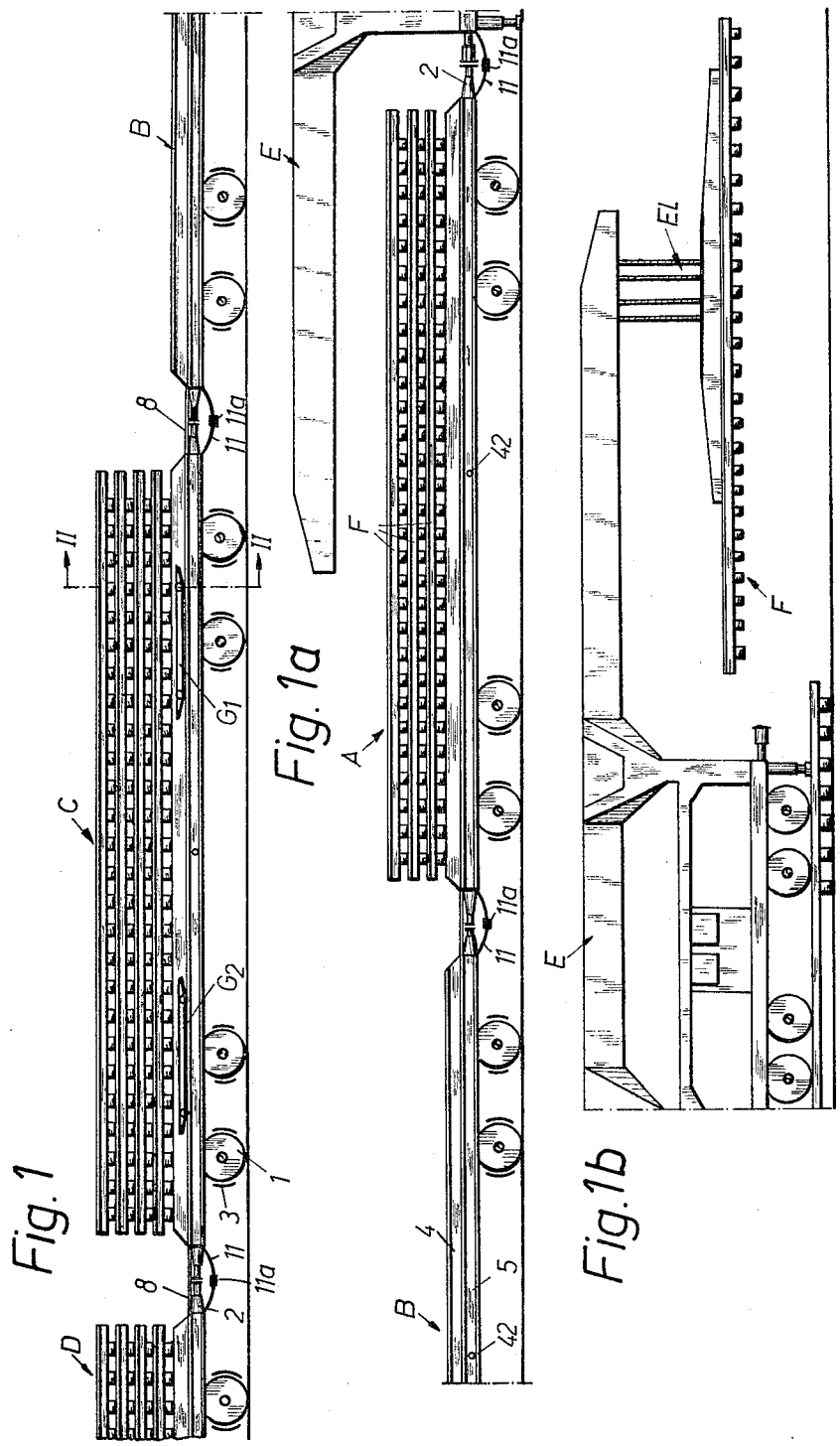

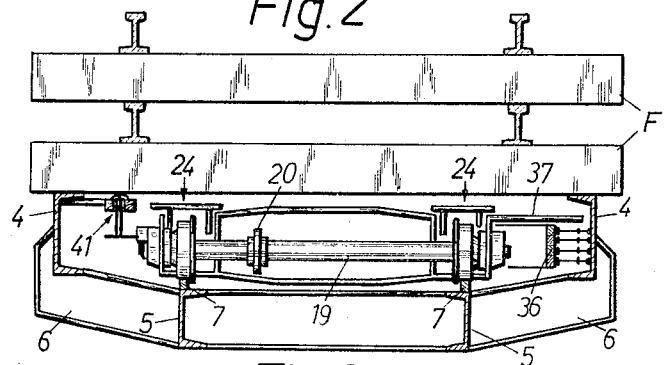
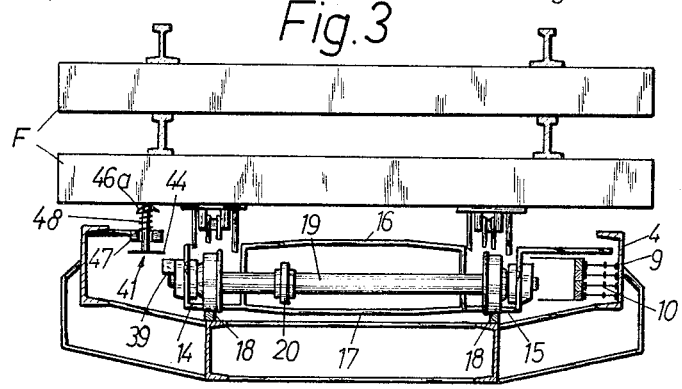
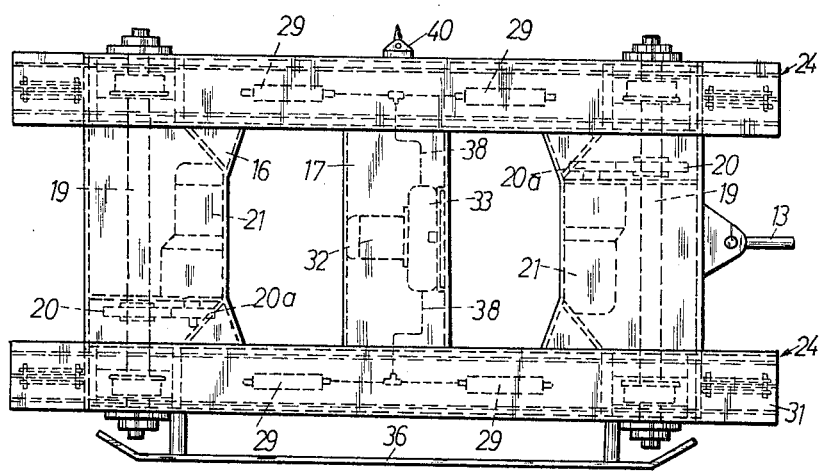

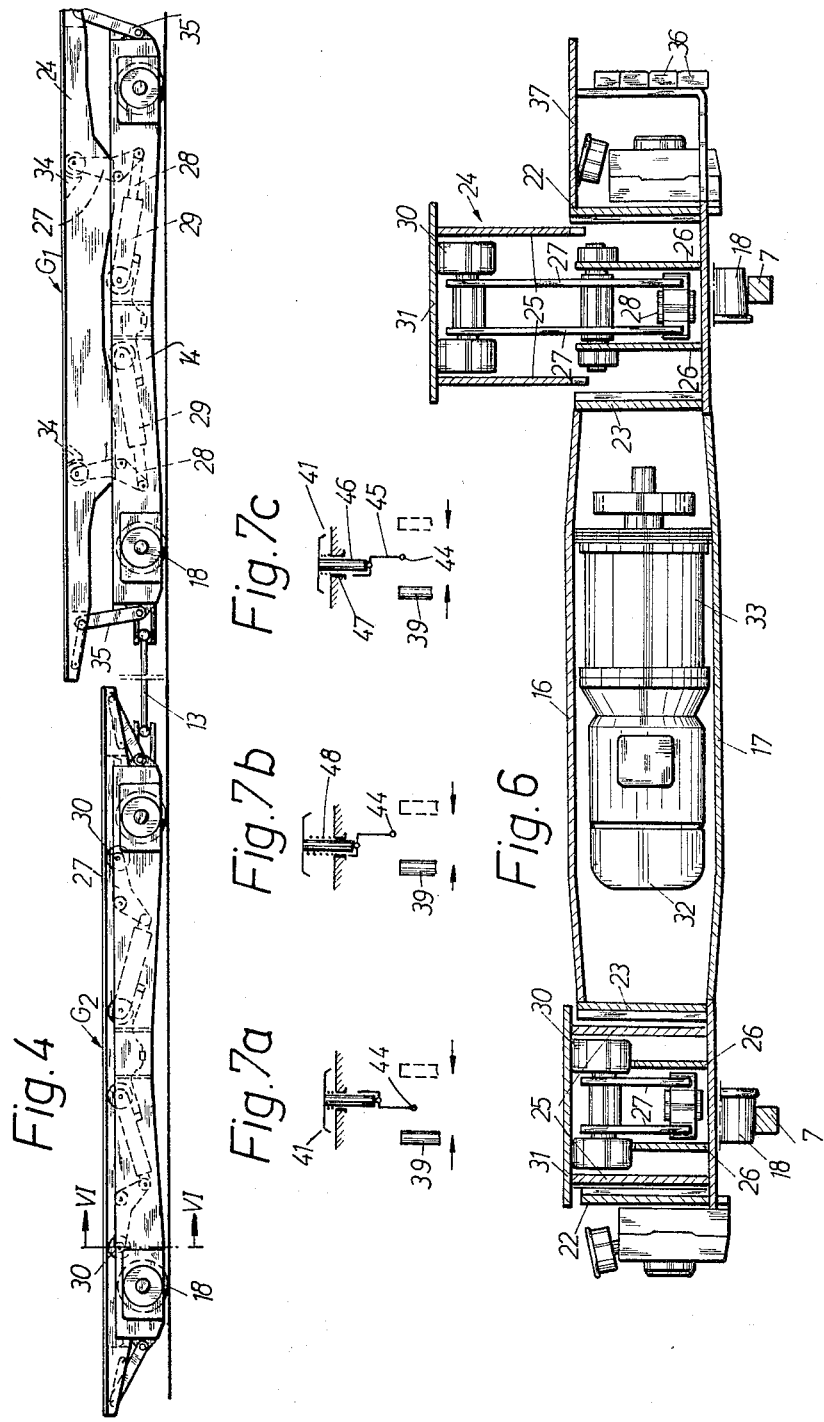

United States Patent Office 3,283,926
Patented Nov. 8, 1966

3,283,926
TRANSPORTING UNIT, ESPECIALLY FOR
RAILWAY TRACK SECTIONS
Karl-Heinz Eckhardt, Minden, Westphalia, Christian Stiefel, Aachen, Rudolf Stahn, Minden, Westphalia, and Wilhelm Blank, Aachen, Germany, assignors to Waggonfabrik Talbot, Aachen, Germany
Filed Oct. 23, 1964, Ser. No. 406,124
Claims priority, application Germany, Oct. 23, 1963,
W 35,493
11 Claims. (Cl. 214—38)

The present invention concerns a transporting unit composed of at least two individual vehicles for transporting long and heavy loads, especially railroad track sections. More specifically, the present invention concerns a transporting unit of the type just mentioned which is equipped with lorries for loading and unloading the respective goods. These lorries are adapted to travel over the entire transporting unit on rails with bridges and in cooperation with housing and conveying devices to receive the goods from the individual vehicles and to convey the same to and unload the same onto the foremost vehicle.

Transporting units of this type are employed for instance in track laying operations for conveying new track sections to and removing old track sections from the respective building site or repair station. Each individual vehicle is adapted to hold for instance from 4 to 5 track sections having a length of approximately 14 to 15 yards and being ready to be installed. Each individual vehicle has to be loaded and unloaded in a special way.

Inasmuch as during the loading and unloading of the transporting unit only the sequence of the individual working operations varies, the following description will deal merely with the unloading of track sections when building new tracks.

By means of a locomotive the transporting unit is on an already laid track section pushed to a gantry crane which is located directly at the building site on the last laid track section, and the transporting unit is coupled to said gantry crane. The said gantry crane has two cantilever arms respectively extending toward the rear and toward the front and supporting a crane trolley adapted to move over the central portion of the track in longitudinal direction thereof. This crane trolley lifts a track section from the foremost vehicle of the transporting unit, moves it forward and then lowers it to the prepared road bed. While the newly laid track section can immediately be travelled upon, the trolley returns for picking up another track section and then moves the same forward while the gantry crane together with the transporting unit coupled thereto is advanced by the length of the track section.

This track laying operation is repeated for each track section until the first vehicle has been unloaded. Inasmuch as the rear cantilever arm or boom of the gantry crane extends only over the first vehicle, and in order to avoid a time consuming switching of the respective empty first vehicle, the track sections of the second, third, etc., vehicle are moved onto the first vehicle. To this end, lorries are employed which are adapted to move on the transporting unit.

It has been suggested for purposes of transferring track sections from an individual vehicle onto the lorries to employ hoisting devices which are arranged in the understructure of each individual vehicle and which are so designed that lifting beams rest on rocker arms rotatably journalled on supports of the understructure and adapted to be actuated electrohydraulically or pneumatically. These lifting beams are adapted together with the track sections resting thereon to be lifted and lowered.

The hoisting device for each vehicle is actuated individually by means of an electric control knob or key which is provided on the vehicle. The lorries are moved below the lifted track sections; by lowering the lifting beam, the track sections are unloaded onto the lorries so that the lifting beams become free. The lorries with the track sections thereon are then moved to the first vehicle the lifting beams of which take off the track sections from the lorries. The unloaded lorries are then returned for picking up new track sections. It will thus be evident that for unloading each individual vehicle, it is necessary for each lifting and lowering operation of the lifting beam to actuate a pushbutton or the like. The movement of the lorries in each individual vehicle is effected by a conveying device which comprises an electrically driven endless chain with a protruding carrier bolt or dog, which chain moves the lorry in the desired direction. The conveying device operates independently of the lifting device and is actuated individually and separately for each vehicle. An unloading device of this type is rather expensive with regard to its construction and the cost of operation. The complete lifting and conveying device installed in each individual vehicle together with the driving units represent a considerable investment from the cost standpoint inasmuch as such unit is frequently composed of ten or more vehicles. Each individual vehicles has to carry the said devices as dead weight because the strong lifting beams are statically not connected to the understructure and therefore do not contribute to the carrying capacity thereof so that an understructure is required which is able by itself to carry the full load. The conveying chain drive in each individual vehicle is, aside from its low degree of efficiency, subjected to considerable wear and therefore liable to disorders. The rate of disorders is directly proportional to the number of the individual vehicles because the unloading of the transporting unit is interrupted in case of a breakdown of any of the vehicles. The necessary actuation of the pushbuttons for the unloading of each vehicle continuously requires the presence of an operator.

It is, therefore, an object of the present invention to provide a transporting unit of the type involved, which will overcome the above-mentioned drawbacks.

It is another object of this invention to provide a transporting unit for long and heavy goods, especially for use in connection with the laying of railroad track sections, in which the number of lift-lorries or trolleys is considerably reduced.

It is still another object of this invention to provide a transporting unit as set forth in the preceding paragraph, in which the individual vehicles will function as mere supporting vehicles which may also be used as flat bottom cars for other transportation purposes in ordinary trains.

A still further object of the present invention consists in the provision of a transporting unit as set forth above, in which lifting and hoisting devices in the understructure of the individual vehicles will be superfluous.

Still another object of the present invention consists in the provision of a transporting unit of the above-mentioned type which will be considerably less expensive in manufacture and operation than heretofore known transporting units of the type involved.

It is also an object of the present invention to provide a transporting unit as set forth above which will allow a continuous and fully automatic unloading of the unit.

These and other objects and advantages of the invention will appear more clearly from the following specification in connection with the accompanying drawings, in which:

FIGS. 1, 1a and 1b illustrate in side view a transporting unit according to the invention, for purposes of clearness said transporting unit being subdivided into three sections shown in FIGS. 1, 1a and 1b respectively.

FIG. 2 represents a section taken along the line II—II of FIG. 1a, the lifting beam of the lift-trolley being lowered.

FIG. 3 represents a section similar to that of FIG. 2 but with the lifting beam of the lift-trolley in lifted position.

FIG. 4 shows a side view of a pair of lift-trolleys, the lifter beam in the left-hand trolley being shown in lowered position and in the right-hand trolley in lifted position.

FIG. 5 is a top view of the trolley shown on the left-hand side of FIG. 4.

FIG. 6 illustrates on a somewhat larger scale than FIG. 4 a section taken along the line VI—VI of FIG. 4, the left-hand lifting beam being lowered while the right-hand lifting beam is shown in lifted position.

FIGS. 7a, 7b and 7c diagrammatically illustrate stop abutments on the individual vehicles A, B, C of FIG. 1.

FIGS. 8 and 9 respectively illustrated in side view and top view a telescopically arranged and universal joint equipped bridging track between two adjacent vehicles of a transporting unit according to the present invention.

The objects of the present invention have been realized by arranging the lifting as well as the conveying device with the driving units therefor in the lift-trolleys of which under normal weight conditions two only are required for the entire transporting unit which may consist of any desired number of individual vehicles. These two lift-trolleys are combined to a pair of trolleys. The individual vehicles are then mere supporting or carrying vehicles which are equipped with tracks for the lift-trolleys and are furthermore equipped with the necessary cables, contacts, and switches for the electric device. These individual vehicles may, therefore, with normal trucks, bogies, pulling and pressing devices, and brakes be employed as flat bottom cars for other transporting purposes in ordinary trains.

In view of the elimination of the lifting and conveying devices from the understructure of the individual vehicles, especially in view of the absence of the lifting beams, the said individual vehicles can be designed statically more favorably, which means they can be designed as lighter structures. The investment costs for the lifting and conveying devices arranged only in the pair of lift-trolleys are considerably lower than with transporting units in which each individual vehicle had to be equipped with such devices. By combining the complete lifting and conveying devices in one pair of lift-trolleys only, it will be possible to provide a central electric switch control system for the electric driving motors of said trolleys whereby the entire transporting unit can be fully automatically unloaded from the first to the last vehicle in a continuous predetermined sequence. The unloading operation is started by the gantry crane operator by throwing a shortcircuit switch in the gantry crane.

Referring now to the drawings in detail, the transporting unit according to the present invention may comprise any desired number, but at least two, individual vehicles with two or more axles. FIGS. 1a and 1b illustrate for instance a unit with four vehicles A, B, C and D which in fully loaded condition may move to the gantry crane E and are mechanically and electrically coupled thereto. FIGS. 1a and 1b illustrate an advanced unloading condition. More specifically, the first or foremost vehicle A has been unloaded by the gantry crane which is about to lower onto the bed the first track section F which was taken from the load conveyed from the second vehicle B to the first vehicle A and which was moved forward by means of the trolley $E_L$. The lift-trolleys $G_1$, $G_2$ have again been moved back onto the third vehicle C in order to take over its load and, following the unloading of the first vehicle, to transport and unload the taken over track sections onto said first vehicle.

The individual vehicles are rail vehicles with standard carriages of bogies 1, standard pulling and pushing devices 2 and the customary brake mechanism 3. The loading length of said vehicles corresponds approximately to the length of the track sections F. The carriage understructure comprises two outer longitudinal beams 4 (FIG. 2) and two inner somewhat lower horizontal beams 5 which in addition to the customary head beams are interconnected by cross beams 6. The outer longitudinal beams 4 serve as a load supporting surface for the load which is in the form of track sections F. The inner longitudinal beams 5 having mounted thereon rails 7 forming the track for the trolleys or carriages are with regard to the upper edges of the outer longitudinal beams located at a lower level to such an extent that the trolleys or carriages will be able unimpededly to move along tracks 7 beneath the load of track sections supporting on beams 4 when the lifter beams 24 have been lowered to their lower position. Lifter beams 24 form the load engaging member of the carriages. Beyond the ends of the vehicles, tracks 7 are, in a manner known per se, designed in the form of a telescopic track sections 8 which can be pivoted in any direction so that the trolleys or carriages may travel from one vehicle to another without difficulty, even when adjacent vehicles are at an angle to each other or are inclined to each other, or are at slightly different levels.

More specifically, the telescopic track 8 illustrated in FIGS. 8 and 9 comprises the track members 8a proper the ends of which are pivotally supported by substantially horizontal pins 8b of bolt members 8c which have a substantially vertical pivot 8d pivotally mounted in a sleeve 8e carried by a supporting member 8f connected to the frame of the carriage in any convenient manner, for instance by welding. It will thus be seen from FIG. 8 that the bridging rail sections 8 can tilt in a vertical plane, and it will also be seen from FIG. 9 that the bridging rail sections 8 can tilt in a horizontal plane.

The outer longitudinal beams 4 have mounted thereon cables 9 for the electric main and control circuits from which the electric energy required for the respective unloading operation is withdrawn at corresponding points in the longitudinal direction of the vehicles through the intervention of pushbuttons 10. The cables 9 installed in the individual vehicles are at the ends of the vehicles interconnected over the entire length of the unit by flexible cables 11 through the intervention of telescopic multi-pole plugs 11a, (FIG. 1). The individual vehicles are additionally equipped with some switches and stop abutments which will be described further below.

For purposes of transferring track sections from one vehicle, for instance vehicle C, to the first vehicle A, there are provided lifting trolleys G of which normally two only are required. These trolleys forming a pair of lifting trolleys $G_1$, $G_2$ are interconnected by means of a universal coupling bar 13 (FIG. 4), so as to maintain a substantially constant distance therebetween.

Each carriage of the lifting trolleys comprises two laterally spaced longitudinal girders 14, 15, (FIGS. 3, 4) which are interconnected by transverse girders 16 and an intermediate transverse girder 17, said transverse girders 16 being arranged above the axles of the carriage. The lifting trolleys are furthermore provided with flanged wheels 18 which are keyed to the driving axles 19 journalled in longitudinal girders 14, 15. Fixedly connected to said driving axles 19 are gears 20 which are adapted to be driven by electric motors 21 (FIG. 5) through the intervention of pinions 20a. The longitudinal girders 14, 15 are welded girders which are open at the top and which comprise outer webs 22, 23 (FIG. 6) and inner webs 26. Guided between the outer webs 22, 23 are likewise welded lifting beams generally designated 24, which are open at the bottom and provided with web plates and a top or chord plate 25. The beams 24 are adapted to be lifted and lowered. Between the inner webs 26 of the longitudinal beam 14, 15 there are provided two-arm lifting levers 27 which are pivotally journalled on horizontal shafts and which form a part of the hoisting means for raising and lowering beams 24. The lower arms of said levers 27 are engaged by piston rods 28 of pressure fluid cylinders 29 whereas the other arms carry rollers 30 on which the lifting beams 24 freely rest by means of chord plates 31. The pressure fluid cylinders 29 are supplied with pressure fluid by a double pump unit 33 for actuating levers 27. The double pump unit 33 is driven by an electric motor 32. Pistons 28 will at the same pressure perform identical strokes. The movements of the pistons are conveyed to the lifting levers 27 whereby the lifting beams resting on the rollers are lifted or lowered. The lifting height of the beams 24 is limited by abutments 34 which will be engaged by levers 27 prior to reaching their upper dead center point. In order to prevent lifting beams 24 which freely rest on rollers 30 from rolling off in longitudinal direction, they have their two ends prevented from moving in longitudinal direction by holding means 35 which take into consideration the lifting movement thereof.

For purposes of withdrawing current from the driving-lifting and control circuit, the lifting trolleys have one side thereof provided with sliding members 36 by means of which push contacts 10 provided on the vehicles can be depressed whereby the current flow is established. The nondepressed contacts 10 are without voltage. When the trolleys are out of range of said push contacts, the manual contact of contacts 10 is not dangerous. Manual contact of the contacts 10 when in depressed condition is prevented by protective covers 37 provided on the trolleys above the sliding members 36.

The various elements, which are known per se, for the fully automatically working electric switch and control operations will be mentioned only to such an extent in connection with the unloading operation as is necessary for the understanding of the function of the entire arrangement.

The loading and unloading operations are effected in both lifting trolleys simultaneously and in the same cycle. However, inasmuch as the loading operation is effected in a manner analogous to the unloading operation, only the unloading operation will be described.

The main current withdrawn from cables 9 through push contacts 10 and slide member 36 is conveyed to progressive switches, such as stepping switches, arranged in the lifting trolleys, and from said progressive switches is, depending on the position of the contacts, conveyed either to the lifting motors or to the driving motors. When closing the main shortcircuit switch, immediately an unloading operation is initiated in conformity with the contact position of the progressive switches. The progressive switches are controlled stepwise by each impulse automatically conveyed to the control circuit, whereby the progressive switches skip from one to another contact.

With the unloading condition according to FIG. 1, according to which the track sections F of the second vehicle B have been transported to the front vehicle A, and the gantry crane is about to unload its first track section F onto the bed, it may be assumed that for some reason, when connecting the last laid track sections to the finished laid track section, a delay occurred which will make is necessary to interrupt the continuous unloading operation. By switching off the main shortcircuit switch, the crane operator may have interrupted the unloading operation purely accidentally at that moment when the return trolleys are on the vehicle C and the lifting motors were about to lift the lifting beam. When this delay has been eliminated and vehicle A has been completely unloaded, the main shortcircuit switch is closed again and the unloading operation is immediately continued.

Contact position I

When the progressive switches occupy a first contact position or when the circuit for lifting motors 32 is manually closed, the lifting motors 32 are turned on. The double pump unit 33 delivers pressure fluid through pressure conduits 38 (FIG. 5) into pressure cylinder 29 (FIGS. 4 and 5) whereby the piston rods 28 lift the lifting beams 24 through lifting levers 27. The lifting levers will when reaching their end positions, abut abutments 34 whereby the pressure fluid is subjected to an overpressure which in turn opens a relief valve which, when an automatic control circuit is employed, in its turn actuates an electric relay built into the control circuit. This relay then releases a current impulse to the progressive switches which jump into contact position II.

Contact position II

When automatically switching over to contact position II, or when manually opening a control switch for motor 32, the current flow to the lifting motors 32 is interrupted, whereupon motors 21 (FIG. 5) are energized for the forward drive thereof. These motors 21 will remain energized until a tilting lever 39 (FIG. 3) of a switch 40 (FIG. 5) interposed in the control circuit, engages a stop abutment 41 (FIGS. 7a, 7b, 7c) provided in the front vehicle A. Switch 40 then closes and brings about a current impulse to the progressive switches which jump into contact position III. This closure of switch 40 may, if so desired, of course also be effected by hand.

Contact position III

When the progressive switches move automatically or are moved manually into a third contact position, drive motors 21 are turned off and a discharge or venting valve for venting the pressure fluid from the lifting cylinders 29 is opened either automatically by movement of said progressive switches to said third position, or said venting valve is opened manually. In view of the fluid leaving the cylinders 29, the lifting beams 24 will be lowered. When the lifting beams occupy their lowest position, they press upon a switch button 46a (FIG. 3) which closes a switch interposed in the control circuit. This switch then releases a current impulse to the progressive switches whereby the latter are moved into a fourth contact position.

Contact position IV

When the progressive switches are automatically or manually shifted over to a fourth contact position, the current to the venting valves is turned off and motors 21 are turned on for the return travel of the lifting trolleys. Of course, this control may also be effected manually. The lifting trolleys will then travel to vehicle D where levers 39 will engage an abutment and bring about a current impulse in the progressive switches. The progressive switches will then jump into the next contact position which will again be the first contact position. This return to the first contact position could, of course, also be effected manually rather than automatically.

The above described contact sequence I to IV either automatically repeat themselves in continuous control rhythms one after another for each individual vehicle up to the completed unloading of the entire transporting unit or are brought about by manual actuation of the switches.

For some reasons, as for instance due to the loading, it may happen that the trolleys are on an individual vehicle which is different from the vehicle where they should be to begin the unloading operation, or it may also happen that the trolleys are turned on at an improper position of the contacts. In order to make sure that the lifting trolleys may first be moved to the vehicle to be unloaded first and that they are in the proper unloading sequence, each individual vehicle is provided with push buttons 42 (FIG. 1a) which are operable manually and which, regardless on which individual vehicle they are actuated by hand, will, when depressed, release a current impulse into the control circuit whereby the non-desired contact positions of the progressive switches are skipped until the desired unloading rhythm has been reestablished. Of course, instead also purely manual control of the respective switches may be employed.

In order to permit the transporting unit to move with any end vehicle to the gantry crane E, the main current supply line for the driving motors 21 has manually controllable pole changing switches of any standard design which prior to the start of the unloading operation are closed for the respective desired unloading direction. For the above reasons and also for the following reasons, a special design is necessary for the stop abutments 41 pertaining to the equipment of the individual vehicles. The purpose of these stop abutments 41 consists in stopping the lifting trolleys on the respective individual vehicle. These stop abutments 41 are so designed that whenever needed the lever 39 of switch 40 in the current supply line will abut against said stop abutments. In this instance, the rocker lever 39 is tilted against a return spring whereby a current impulse in the progressive switches brings about a corresponding contact skip.

When starting from contact position II, in which the driving motors 21 are turned on and the lifting trolleys are travelling to vehicle A, it is necessary that rocker lever 39 again passes by stop abutments 41 which previously stopped said lever 39. However, in this instance, rocker lever 39 does not have to tilt, which means that the lifting trolleys do not have to be stopped. As will be evident from FIG. 7c, the lower part 45 adapted to perform a pendulum movement and pertaining to a shank 46 adapted to be lifted and lowered is provided with abutments 44, lower part 45 being able to deviate in one direction only, namely toward the right with regard to FIG. 7c.

On the empty vehicle B the lifting trolleys must neither during the advance movement nor during the return movement be stopped. To this end, the abutments of all individual vehicles are designed so as to be dependent on the load. Shank 46 is journalled in a guiding mmeber 47 so as to be adapted to be lifted and lowered and is pressed into its up-position by means of a spring 48 (FIG. 7b). As a result thereof, the abutment members 44 are so high that the rocker lever 39 can pass therebelow in an unimpeded manner.

The abutment members 44 on vehicle A have to be located within the abutment range of lever 39 even though the vehicle has been unloaded. In its up-position, shank 47 has its upper mushroom-shaped member 46a. (FIG. 3) extend up to beyond the resting plane of track section F. The resting track sections press said shank into its lower position. In contrast to the abutment with the vehicle C, the abutment on vehicle A has to be fixed toward the right while it must be able to carry out a pendulum movement toward the left. In order that all individual vehicles may at random be used in connection with a transporting unit, the abutments 41 are on all vehicles rotatable by 180° and arrestable in this position by any standard arresting means while being journalled in the guiding means 47. On vehicle A and also on the last vehicle, it is necessary always to stop the lifting trolleys regardless of whether these vehicles are loaded or not loaded. In order to assure that also when the vehicles are not loaded the abutments 41 remain in their lower position, the shanks 46 of all individual vehicles may be arrested in this lower position from case to case by any standard arresting means. The thus designed abutments will assure any desired employment of the individual vehicles as front, intermediate or end vehicle.

The current collecting contacts 10 (FIG. 3) are so arranged in the longitudinal direction of the vehicles that the sliding member 36 (FIG. 5) of at least one lifting trolley will always press-in one collecting contact with means that the lifting trolleys will be under current in each position of the transport unit. On the other hand, the collecting contacts 10 are so arranged that a sliding member 36 will contact a collecting contact only when the trolley thereof will with none of its axles be on the bridging track 8. It is a matter of course that the transporting unit is safe-guarded as far as possible against accidents. It has already been mentioned that the non-depressed current collecting contacts 10 are without voltage and that the pressed-in current collecting contacts are protected against manual contact by a cover 37. Furthermore, at both sides of each individual vehicle, there are provided shortcircuit switches by means of which a shortcircuit may be produced which turns off the main shortcircuit switch in the gantry crane E whereby the entire transporting unit will be without voltage.

It is, of course, to be understood that the present invention is, by no means, limited to the particular construction and arrangement shown in the drawings but also comprises any modifications within the scope of the appended claims.

What we claim is:

1. A transporting unit for long heavy goods, especially railway track sections, which includes: at least two rail vehicles coupled together in end to end relation, each vehicle having a load supporting surface, track means supported by and extending lengthwise along said vehicles and across the space therebetween, said track means being disposed at a level beneath the level of said supporting surfaces, carriage means moveably supported on said track means and adapted to support said goods to be transported by said transporting unit, said carriage means having a length not greater than the length of one of said vehicles and being disposed within the vertical space beneath said load supporting surface, driving means carried by said carriage means and drivingly connected thereto for driving the carriage means on said track means, load engaging means on said carriage means retractable thereon to a level beneath said load supporting surfaces and elevatable thereon to a level above said load supporting surfaces, and hoisting means on said carriage means adapted selectively to raise and lower said load engaging means thereon to different levels for picking up a load from a said load supporting surface or for depositing a load on a said load supporting surface.

2. A transporting unit according to claim 1 which includes separate sources of power connected to said driving means and to said hoisting means respectively.

3. An arrangement according to claim 2, which includes control means on said carriage means adapted for controlling the supply of power from said sources to said driving means and to said hoisting means, and means on said vehicles responsive to movement of said carriage means thereon for actuating said control means.

4. A transporting unit according to claim 1 in which said carriage means comprises at least two individual carriages interconnected in end to end relation and each of said carriages having two spaced driving axles, and each of said carriages also comprising two electric motors respectively drivingly connected to the said driving axles thereof for driving the respective carriages on said track means.

5. A transporting unit according to claim 4 in which said load engaging means comprises a load engaging member on each said carriage, said hoisting means comprising motor means on each carriage operatively connected to the respective load engaging member for actuating the same, said control means being adapted for effecting energization of said electric motors and said motor means sequentially.

6. An arrangement according to claim 3, in which the said means on the vehicles operable for actuating said control means on the carriage means are selectively adjustable into and out of effective position.

7. An arrangement according to claim 4, in which both said electric motors and said motor means are reversible.

8. An arrangement according to claim 6, in which said control means is a switch and said means on the vehicles is a switch actuating cam on each vehicle.

9. An arrangement according to claim 8, in which a switch is provided on the carriage means and is actuated by said load engaging means when the latter is in lowered position, said switch being adapted to control said driving means.

10. An arrangement according to claim 4, in which said electric motors are reversible.

11. An arrangement according to claim 2, which includes emergency means operable from either side of either of said vehicles for interrupting the operation of said driving means and said hoisting means for stopping any loading and unloading operation of said transporting unit.

References Cited by the Examiner

UNITED STATES PATENTS

| | | |
|---|---|---|
| 1,918,419 | 7/1933 | Needham. |
| 2,832,481 | 4/1958 | Stevens et al. _____ 214—38 |
| 2,877,981 | 3/1959 | McMurry _____ 214—38 |
| 2,920,773 | 1/1960 | Knabe _____ 214—1 |
| 3,105,673 | 10/1963 | Williamson _____ 254—8 |

FOREIGN PATENTS

| | | |
|---|---|---|
| 487,703 | 12/1929 | Germany. |
| 623,360 | 12/1935 | Germany. |

GERALD M. FORLENZA, *Primary Examiner.*

ALBERT J. MAKAY, *Examiner.*